United States Patent
Francois et al.

(10) Patent No.: US 11,558,615 B2
(45) Date of Patent: Jan. 17, 2023

(54) QUANTIZATION PARAMETER PREDICTION FOR VIDEO ENCODING AND DECODING

(71) Applicant: InterDigital VC Holdings, Inc., Wilmington, DE (US)

(72) Inventors: Edouard Francois, Cesson-Sevigne (FR); Fabrice Le Leannec, Cesson-Sevigne (FR); Fabien Racape, Palo Alto, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/043,238

(22) PCT Filed: Apr. 9, 2019

(86) PCT No.: PCT/US2019/026537
§ 371 (c)(1),
(2) Date: Sep. 29, 2020

(87) PCT Pub. No.: WO2019/204083
PCT Pub. Date: Oct. 24, 2019

(65) Prior Publication Data
US 2021/0021830 A1  Jan. 21, 2021

(30) Foreign Application Priority Data

Apr. 16, 2018 (EP) ..................................... 18305469
Sep. 3, 2018 (EP) ..................................... 18306161

(51) Int. Cl.
*H04N 19/124* (2014.01)
*H04N 19/186* (2014.01)
(Continued)

(52) U.S. Cl.
CPC ......... *H04N 19/124* (2014.11); *H04N 19/186* (2014.11); *H04N 19/70* (2014.11); *H04N 19/98* (2014.11)

(58) Field of Classification Search
USPC ...................................................... 375/240.02
See application file for complete search history.

(56) References Cited

U.S. PATENT DOCUMENTS

| 9,648,316 | B2* | 5/2017 | Tanaka | H04N 19/122 |
| 2014/0247869 | A1* | 9/2014 | Su | H04N 19/124 375/240.03 |

(Continued)

FOREIGN PATENT DOCUMENTS

| EP | 2685723 A1 | 1/2014 |
| EP | 3026910 A1 | 6/2016 |

(Continued)

OTHER PUBLICATIONS

Zhao J, et al., "De-Quantization and Scaling for Next Generation Containers", JVET of ITU-T SG 16 WP 3 and ISO/IEC JTC 1/SC 29/WG 11, 2nd meeting; San Diego, USA, Feb. 20-26, 2016, 5 pages.

(Continued)

*Primary Examiner* — Patricia I Young
(74) *Attorney, Agent, or Firm* — Condo Roccia Koptiw LLP

(57) ABSTRACT

Apparatus and methods for encoding and decoding video data having improved quantization parameter prediction are presented and can include using a combination of quantization parameter prediction values obtained from respective (Continued)

ones of a plurality of quantization parameter prediction methods to encode or decode the video data.

16 Claims, 11 Drawing Sheets

(51) Int. Cl.
    *H04N 19/70*     (2014.01)
    *H04N 19/98*     (2014.01)

(56) References Cited

U.S. PATENT DOCUMENTS

| | | | |
|---|---|---|---|
| 2019/0014305 A1* | 1/2019 | Wang | H04N 5/23238 |
| 2019/0182484 A1* | 6/2019 | Kalevo | H04N 19/17 |

FOREIGN PATENT DOCUMENTS

| | | | |
|---|---|---|---|
| EP | 3267684 A1 | 1/2018 | |
| EP | 3407606 A1 | 11/2018 | |
| WO | WO 2017138761 A1 | 8/2017 | |

OTHER PUBLICATIONS

De Lagrange, P., et al., "CE7-reiated: Implicit QP-offset based on block size", JVET of ITU-T SG 16 WP 3 and ISO/IEC JTC 1/SC 29/WG 11, 13th Meeting: Marrakech, MA, Jan. 9-18, 2019, Document: JVET-M0114, 8 pages.

Kawamura, et al. Luma Chroma QP Adaption for Hybird Log-Gamma Sequences Encoding, 28, JCT-VC Meeting; Jul. 15, 2017-Jul. 21, 2017, 5 pages.

Francois et al., "Signalling, Backward Compatibility and Display Adaptation for HDR/WCG Video Coding (Draft 2)", JCTVC-Z1012, Editors, Joint Collaborative Team on Video Coding (JCT-VC) of ITU-T SG 16 WP 3 and ISO/IEC JTC 1/SC 29/WG 11, 26th Meeting: Geneva, CH, Jan. 12-20, 2017, 32 pages.

ISO/IEC, "Conversion and Coding Practices for HDR/WCG Y'CbCr 4:2:0 Video with PQ Transfer Characteristics", Technical Report ISO/IEC 23008-14, Aug. 2018, 44 pages.

ITU-R, "Image Parameter Values for High Dynamic Range Television for Use in Production and International Programme Exchange", Recommendation ITU-R BT.2100-0, BT Series, Broadcasting Service (Television), Jul. 2016, 17 pages.

* cited by examiner

| luma range (avgY) | dQP |
|---|---|
| avgY < 301 | 3 |
| 301 ≤ avgY < 367 | 2 |
| 367 ≤ avgY < 434 | 1 |
| 434 ≤ avgY < 501 | 0 |
| 501 ≤ avgY < 567 | -1 |
| 567 ≤ avgY < 634 | -2 |
| 634 <= avgY < 701 | -3 |
| 701 <= avgY < 767 | -4 |
| 767 <= avgY < 834 | -5 |
| intL >= avgY | -6 | ively one of a plurality of quantization parameter prediction
QUANTIZATION PARAMETER PREDICTION FOR VIDEO ENCODING AND DECODING

CROSS REFERENCE TO RELATED APPLICATIONS

This application is the National Stage Entry under 35 U.S.C. § 371 of Patent Cooperation Treaty Application No. PCT/US2019/026537, filed Apr. 9, 20219, which claims priority from European Patent Application No. 18305469.1, filed Apr. 16, 2018, and European Patent Application No. 18306161.3, filed Sep. 3, 2018, the contents of which are hereby incorporated by reference herein.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. To reconstruct the video, the compressed data are decoded by inverse processes corresponding to the prediction, transform, quantization and entropy coding.

In at least some conventional codecs, quantization parameters (QPs) can vary over blocks, also called Coding Units (CUs). A QP is then coded for each block in the stream. A prediction process is applied to reduce the coding cost of this parameter. In HEVC for instance, the QP value can be predicted from the QPs of the top and left CUs surrounding the current CU. In addition, a global QP offset value (QPo), depending on the bit depth of the signal) and local delta QP (dQP) values can be coded. In general, an embodiment provides improved coding and decoding of these quantization parameters or the like for an encoder and/or a decoder.

SUMMARY

In general, an aspect involves an apparatus for encoding video data comprising at least a memory and one or more processors, wherein the one or more processors are configured to: identify at least one of a plurality of quantization parameter prediction methods to use to encode the video data; and encode the video data to produce encoded video data based on the at least one quantization parameter prediction method, wherein the encoded video data include data indicating the at least one quantization parameter prediction method used to produce the encoded video data.

In general, another aspect involves a method for encoding video data comprising: identifying at least one of a plurality of quantization parameter prediction methods to use to encode the video data; and encoding the video data based on the at least one quantization parameter prediction method, wherein the encoded video data includes data indicating the at least one quantization parameter prediction method used to encode the video data.

In general, another aspect involves an apparatus for decoding video data comprising at least a memory and one or more processors, wherein the one or more processors are configured to: access the video data; identify at least one of a plurality of quantization parameter prediction methods indicated in the video data to use to decode the video data; and decode the video data to obtain the decoded video data based on the at least one quantization parameter prediction method indicated in the video data.

In general, another aspect involves a method for decoding video data, comprising: accessing the video data; identifying at least one of a plurality of quantization parameter prediction methods indicated in the video data to use to decode the video data; and decoding the encoded video data to obtain the decoded video data based on the at least one quantization parameter prediction method indicated in the video data.

In general, another aspect involves a bitstream formatted to include encoded video data, wherein the encoded video data are encoded by: identifying at least one of a plurality of quantization parameter prediction methods to use to encode the video data; and encoding the video data to produce encoded video data based on the at least one quantization parameter prediction method, wherein the encoded video data includes data indicating the at least one quantization parameter prediction method used to produce the encoded video data.

In general, an aspect involves an apparatus for encoding video data comprising at least a memory and one or more processors, wherein the one or more processors are configured to: obtain a plurality of quantization parameter prediction values, each corresponding to a respective one of a plurality of quantization parameter prediction methods; obtain a predicted value of a quantization parameter based on a combination of the plurality of quantization parameter prediction values; and encode the video data to produce encoded video data based on the predicted value of the quantization parameter, wherein the encoded video data includes data indicating the combination of the plurality of quantization parameter prediction values.

In general, another aspect involves a method for encoding video data comprising: obtaining a plurality of quantization parameter prediction values, each corresponding to a respective one of a plurality of quantization parameter prediction methods; obtaining a predicted value of a quantization parameter based on a combination of the plurality of quantization parameter prediction values; and encoding the video data to produce encoded video data based on the predicted value of the quantization parameter, wherein the encoded video data includes data indicating the combination of the plurality of quantization parameter prediction values.

In general, another aspect involves an apparatus for decoding video data comprising at least a memory and one or more processors, wherein the one or more processors are configured to: access the video data; identify a plurality of quantization parameter prediction methods indicated in the video data; obtain a plurality of quantization parameter prediction values, each corresponding to a respective one of the plurality of quantization parameter prediction methods; obtain a predicted value of a quantization parameter based on a combination of the plurality of quantization parameter prediction values; and decode the video data to produce encoded video data based on the predicted value of the quantization parameter.

In general, another aspect involves a method for decoding video data, comprising: accessing the video data; identifying a plurality of quantization parameter prediction methods indicated in the video data; obtaining a plurality of quantization parameter prediction values, each corresponding to a respective one of the plurality of quantization parameter prediction methods; obtaining a predicted value of a quantization parameter based on a combination of the plurality of quantization parameter prediction values; and decoding the video data to produce encoded video data based on the predicted value of the quantization parameter.

In general, another aspect involves a bitstream formatted to include encoded video data, wherein the encoded video data are encoded by: obtaining a plurality of quantization parameter prediction values, each corresponding to a respective one of a plurality of quantization parameter prediction methods; obtaining a predicted value of a quantization parameter based on a combination of the plurality of quantization parameter prediction values; and encoding the video data to produce encoded video data based on the predicted value of the quantization parameter, wherein the encoded video data includes data indicating the combination of the plurality of quantization parameter prediction values.

One or more of the present embodiments also provide a computer readable storage medium having stored thereon instructions for encoding or decoding video data according to the methods or the apparatuses described herewith. The present embodiments also provide a computer readable storage medium having stored thereon a bitstream generated according to the methods or the apparatuses described herewith. The present embodiments also provide methods and apparatuses for transmitting or receiving the bitstream generated according to methods or the apparatuses described herewith.

BRIEF DESCRIPTION OF THE DRAWINGS

The present disclosure may be better understood by consideration of the detailed description below in conjunction with the accompanying figures, in which.

In the various figures, like reference designators refer to the same or similar features.

DETAILED DESCRIPTION

In general, the present disclosure involves quantization parameter (QP) prediction as it relates to video encoding and decoding. For example, as mentioned above, a prediction process can be applied to reduce a coding cost associated with QP. Encoding of video data in an encoder can be based on various QP prediction methods. The QP prediction method to be used can be determined or identified based on one or more of various parameters, e.g., one parameter might be an indication of a type of video signal such as dynamic range. For example, one type of QP prediction can be applied during encoding of a standard dynamic range (SDR) signal and another for a high dynamic range (HDR) signal. A decoder can identify the QP prediction method used and decode the encoded video data based on the identified method.

Figure 1:
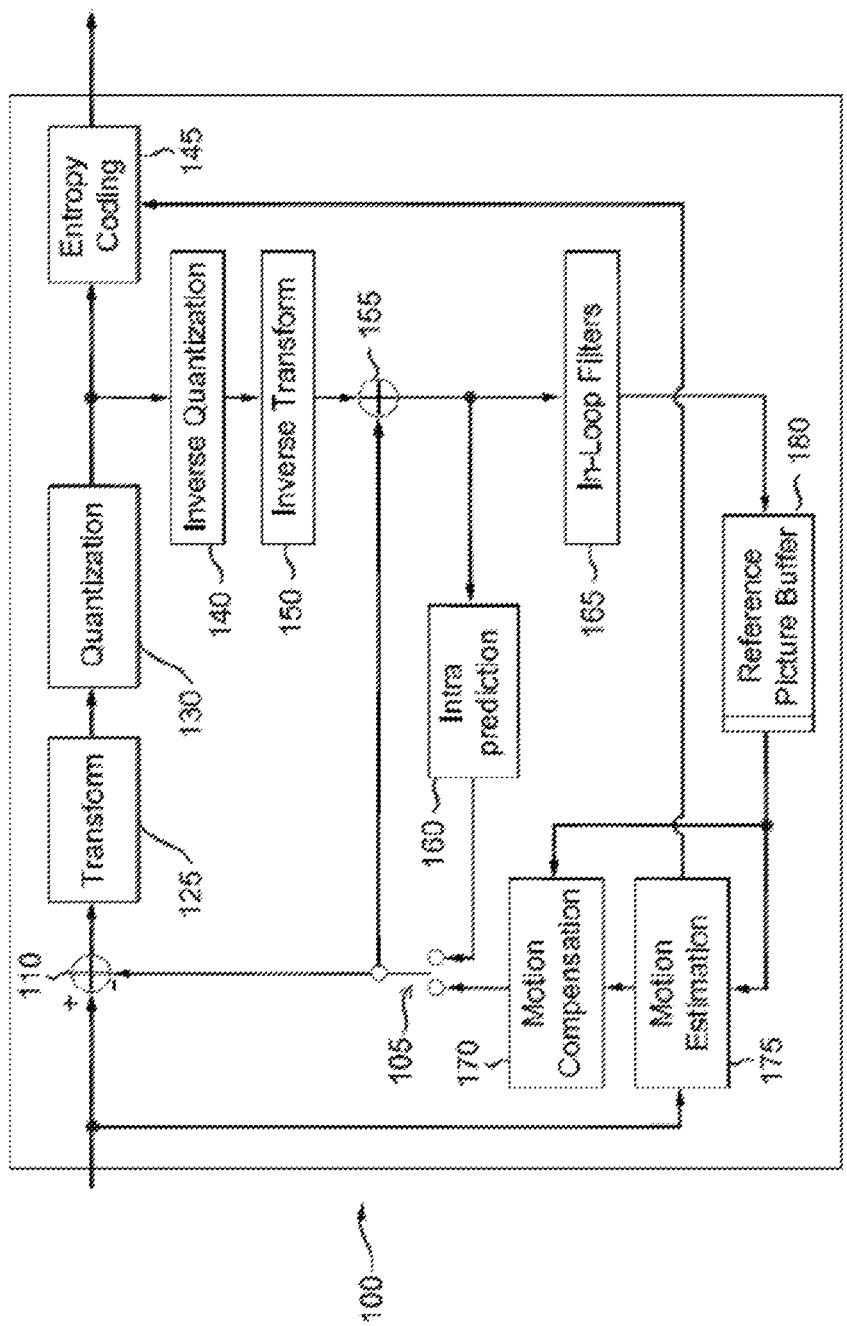
FIG. 1 illustrates a block diagram of an example of an embodiment of a video encoder.

Turning now to the figures, FIG. 1 illustrates an example of a video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by JVET.

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
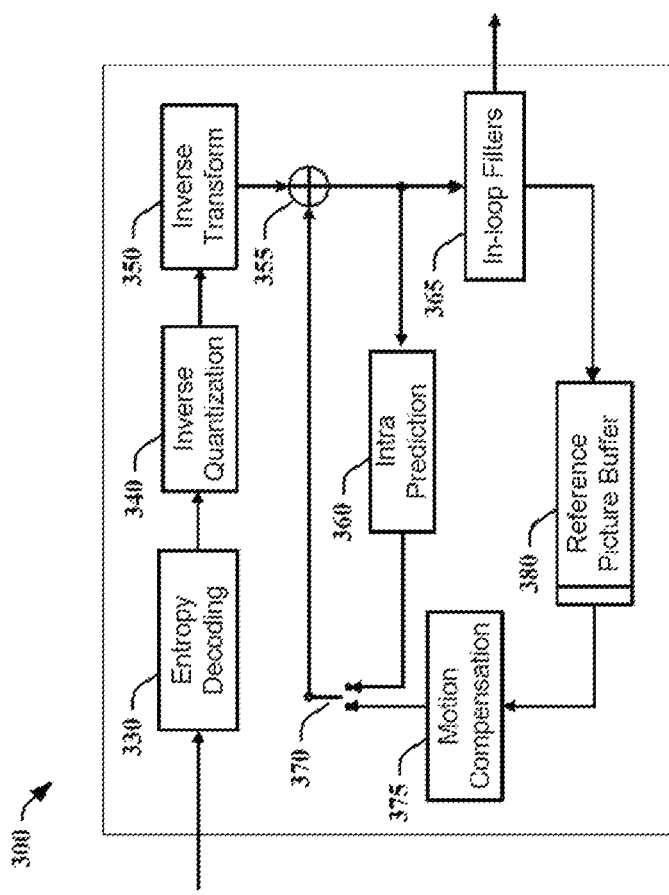
FIG. 3 illustrates a block diagram of an example of an embodiment of a video decoder.

FIG. 3 illustrates a block diagram of an example of a video decoder 300, such as an HEVC decoder. In the example decoder 300, a signal or bitstream is decoded by the decoder elements as described below. Video decoder 300 generally performs a decoding pass reciprocal to the encoding pass as described in FIG. 1, which performs video decoding as part of encoding video data. FIG. 3 may also illustrate a decoder in which improvements are made to the HEVC standard or a decoder employing technologies similar to HEVC, such as a decoder based on or improved upon JEM.

In particular, the input of the decoder includes a video signal or bitstream, which may be generated by video encoder 100. The signal or bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). Advanced Motion Vector Prediction (AMVP) and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

In at least one embodiment, a quantization process in an encoder such as encoder 100 of FIG. 1 may comprise division by a quantization step size (Qstep) and a subsequent rounding. Conversely, in at least one embodiment of an inverse or de-quantization process in a decoder such as decoder 300 of FIG. 3 may comprise multiplication by the quantization step size. In both H.264/AVC and H.265/HEVC, a quantization parameter (QP) is used to determine the quantization step size.

As mentioned already, the quantization parameter (QP) can vary over blocks, also called Coding Units (CU) in some examples of codecs. A QP is then coded for each block or group of blocks in the stream. A prediction process is applied to reduce the coding cost of this parameter. In HEVC for instance, the QP value can be predicted from the QPs of the neighboring top and left CUs, or group of CUs, surrounding the current CU. The prediction value is noted QPpred. In addition, a global QP offset value (QPo), depending on the bit depth of the signal) and local delta QP (dQP) values can be coded. The actual QP at the decoder may be computed as:

$$QPy = ((QPpred + dQP + 52 + 2*QPo)\%(52 + QPo))$$

In at least one embodiment, a quantization parameter prediction (QPpred) may be derived automatically, based on the already coded signal. Such embodiments can be based on processes that consider factors, parameters, or data such as the predicted samples in the current block or a spatial position in the picture. The following information describes various examples of embodiments of advanced QP prediction.

Figure 2:
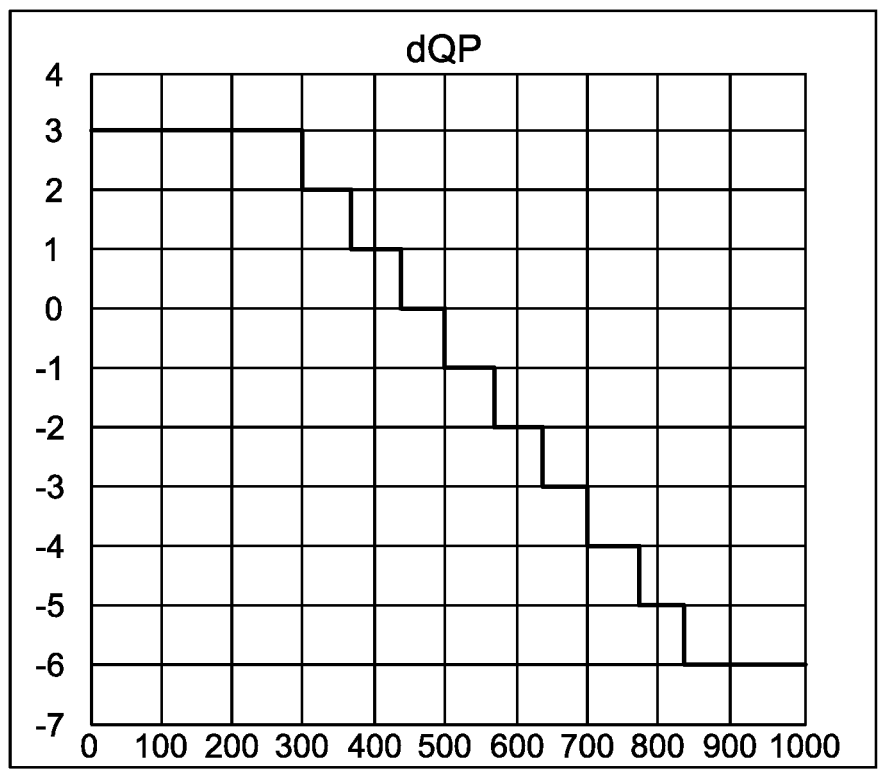
FIG. 2 illustrates a QP table and a graph for an example of an embodiment of an advanced QP prediction method for HDR signals.

In at least one embodiment, an advanced QP prediction method can comprise applying a local QP adaptation based on the value of luma samples. For example, prior to the quantization of a given block at the encoder, the average luma value for the given block can be computed (using the original, or the prediction signal). Then, a QP adaptation can be applied, which can comprise adding a delta QP value (dQP) that depends on the average luma value, to the QP specified for the slice. In at least one embodiment, a dQP table is designed per range of luma values. An example of a table for a 10-bit signal is plotted and shown in FIG. 2. In general, this process can be useful at both an encoder and a decoder, e.g., by computing an average luma value of the prediction signal for the considered block, and by deriving the corresponding dQP value from the dQP table at both encoder and decoder. In at least one embodiment, average luma dependent QP adaptation may be applied to high dynamic range (HDR) signals.

In at least one embodiment, an advanced QP prediction method can comprise computing the dQP at the encoder based on an activity, e.g., luma activity, of the block or of the area to which the block to encode belongs. For example:

$$dQP = -3 \log_2 w_k$$

where $w_k$ is a weighting value depending on the luma samples of a block $B_k$, positioned at position k, as explained below.

Let s(x, y), with $0 \le x < W$ and $0 \le y < H$, represents the original or prediction luma samples of a picture of width W and height H. A high-pass filtered version of the luma component is derived as:

$$h(x,y) = 4 \cdot s(x,y) - s(x-1,y) - s(x+1,y) - s(x,y-1) - s(x,y+1)$$

For each block $B_k$, a local activity $a_k$ is calculated according to:

$$a_k = \max\left(1; \left(\frac{1}{|B_k^*|} \sum_{(x,y) \in B_k^*} |h(x, y)|\right)^2\right)$$

where $B_k^*$ represents the considered block $B_k$ without the border samples (with =0, y=0, x=W−1, or y=H−1). The term $|B_k^*|$ specifies the number of samples in the block $B_k^*$.

Finally, $w_k$, for each block $B_k$ at index k, is calculated according to:

$$w_k = \left(\frac{a_{pic}}{a_k}\right)^\beta$$

where $a_{pic}$ is a normlization factor that, for example, can be set to 2.2B, where B is the bit-depth of the signal, and β can be, for example, set to ⅔.

In general, this process can be useful at both an encoder and a decoder, e.g., by computing at the encoder and at the decoder the activity value of a block based on the prediction signal, and by deriving the corresponding dQP value from the corresponding weight. Also, in general a luma activity dependent QP adaptation may be useful for coding such as perceptual coding.

In at least one embodiment, the coding of content can be based on a spatially adaptive quantization. For example, the QP computation can be based on the CU's location and can be derived at the decoder side. The QP value for each CU can be computed based on the weight used in computing the Weighted Spherical PSNR:

$$w(y) = \frac{\cos(\pi y)h}{\sum_{i\ from\ 0...h-1} w(i)}$$

where y is the vertical coordinate of the sample and h is the vertical size of the equirectangular picture.

An average weight over all the sample locations of the CU can be computed:

$$w_{cu}(y_0) = \sum_{y=y_0}^{y_0+s_y} w(y)$$

where $y_0$ corresponds to the CU's vertical coordinate of the top samples and $s_y$ denotes the vertical size of the CU.

For example, QP can be calculated for each line of CUs as follows:

$$QP(y_0) = \min(QP_{base} - 3*\log_2(w_{cu}(y_0)), QP_{max})$$

with $QP_{max}$=51, and $QP_{base}$ corresponds to the QP of the current slice.

In general, this process can be useful at both an encoder and a decoder, e.g., applying a spatially adaptive quantization at both an encoder and a decoder. Also, as an example, a position dependent QP adaptation can be useful for a VR360 ERP signal (virtual reality 360° equirectangular projection).

Various examples of embodiments for deriving or predicting the QP or dQP value are described. In general, such examples and others are envisioned that can be included at both an encoder and a decoder. At least one example of an embodiment comprises including signaling in a signal or bitstream, e.g., at an encoder, and a decision process at the decoder based on the signaling to perform an advanced QP process.

Note that an approach such as the described example involving signaling and/or one or more of the other examples of embodiments described herein does not prevent the encoding of an actual dQP value per block or group of blocks, instead of or on top of the QP or dQP prediction process, for instance to improve a perceptual quality of the coded signal.

As described herein, various examples of embodiments are referred to as advanced QP prediction providing methods more elaborated than what may be considered conventional QP prediction, e.g., that of HEVC that is based only on locally neighboring QP values.

As described herein, one or more examples of embodiments may apply to both encoder and decoder, e.g., the above-described three examples of advanced QP prediction methods based on: 1) a value of luma samples, e.g., an average luma value, for a given block (referred to elsewhere herein as "Method 1"), or 2) an activity, e.g., luma activity, of a block or area to which a block belongs (referred to elsewhere herein as "Method 2"), or 3) a spatially adaptive quantization, e.g., based on a CU's location and a weight used in computing the Weighted Spherical PSNR (referred to elsewhere herein as "Method 3").

Several advanced QP prediction methods may be considered in the codec, e.g., depending on the video format such as, e.g., the nature of the video (e.g. SDR, HDR, VR360) or on the content of the video (e.g. smooth pictures, highly textured content). As illustrated above, different advanced QP prediction methods may be used for coding an SDR signal, an HDR signal, or a VR360 signal. Yet another method may be used to improve the perceptual quality of an SDR or HDR signal.

Various embodiments also indicate in the encoded signal or bitstream the actual advanced QP prediction method to be used at the decoder, and specify at the decoder the way of selecting this method. This is what is addressed in at least one example of an embodiment or implementation to be discussed below.

At least one embodiment may realize one or more of various advantages. The delta QP is classically explicitly coded in the stream. As indicated, some embodiments predict its value, using an inferring method. At least one additional embodiment provides for the use of different inferring methods. For each embodiment, the advanced QP prediction method can be specific to the context of the embodiment, e.g., SDR signal, HDR signal, VR360 signal.

In at least one embodiment, a dQP/QP prediction process applied in the decoder may be modified to comprise, for example:

enabling several advanced QP prediction methods in the decoder;

inserting in the signaling syntax elements that enable the decoder to identify the advanced QP prediction method to use;

selecting, based on these syntax elements, the advanced QP prediction method to apply at the decoder; and/or applying the advanced QP prediction method for deriving the QP at the decoder.

Accordingly, various embodiments as described herewith may be used, for example, to modify components relating to quantization and inverse quantization (130, 140, 340) such as of the JVET or HEVC encoder 100 and decoder 300 as shown in FIG. 1 and FIG. 3 respectively. Moreover, the present embodiments are not limited to JVET or HEVC, and may be applied to other standards, recommendations, and extensions thereof. In addition, other components may also be modified in implementing the various embodiments. Furthermore, various aspects and/or embodiments described herewith may be used individually or in combination.

Figure 4:
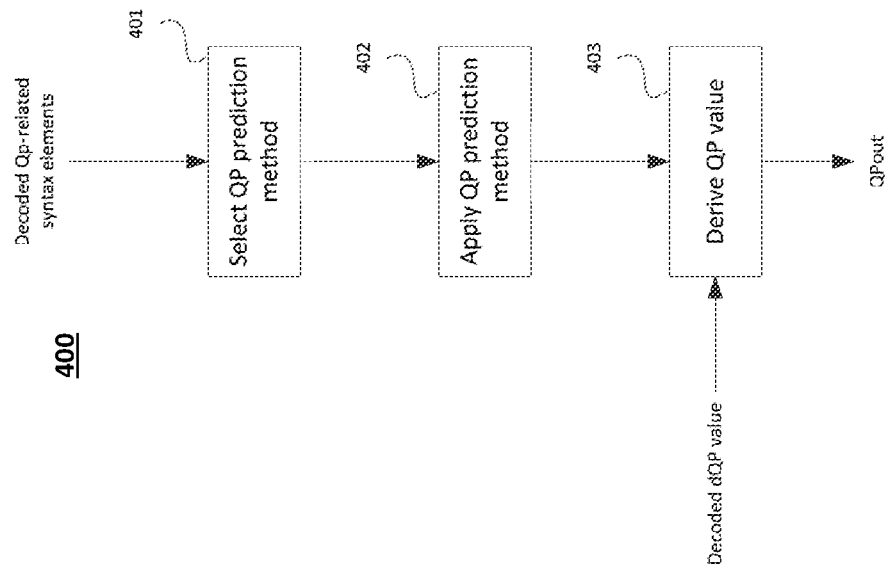
FIG. 4 illustrates an example of a method, according to an embodiment.

FIG. 4 illustrates an example of a process 400 implemented by at least one embodiment, although other processes, including variations of FIG. 4 may be used in other embodiments. The example process 400 can apply at the decoder or the encoder. It can apply at the CU, CTU, or group of CUs level. The process can be applied, for example, to the luma and chroma components separately.

Accordingly, the inputs to the process 400 of FIG. 4 are the decoded QP syntax elements and the decoded local dQP value, obtained after parsing the bitstream. The decoded local dQP value may be part of the decoded QP syntax elements, or an additional element not included in the decoded QP syntax elements. In step 401, based on the value(s) of the decoded QP syntax element(s), a QP prediction method is selected among a set or a plurality of available QP prediction methods. In step 402, the selected QP prediction method is applied, for example, to derive a QP prediction value denoted as QPpred herein. In step 403, the actual QP value for the CU is derived, based on the value QPpred and from the decoded local dQP value. The output is the QP value, denoted QPout, to apply to the CU for inverse quantization of the residual signal.

In general, at least one example of an embodiment can include an example of syntax such as that described below. Signaling syntax features such as the examples described and shown below may be inserted, for example, in the SPS syntax of HEVC. Table 1 below illustrates an example of an embodiment of syntax. The portion of syntax being focused on in regard to at least one example of an embodiment is illustrated in Table 1, e.g., lines 9-12. Examples shown below are merely illustrative and may be modified by one skilled in the art accordingly to accomplish the same or similar signaling functions. Such syntax may also be introduced in other levels or sections, such as, for example, the PPS or the slice header.

The following are examples of syntax elements specified for Table 1 below:

quantpred_enabled_flag: this flag indicates whether advanced QP prediction applies or not.

quant_pred_method_idx: this parameter indicates the advanced QP prediction method to be applied. The parameter is only coded if advanced QP prediction is enabled, i.e., when quant_pred_enabled_flag is equal to 1.

TABLE 1

```
seq_parameter_set_rbsp( ) {
    ...
    scaling_list_enabled_flag
    if( scaling_list_enabled_flag ) {
        sps_scaling_list_data_present_flag
        if( sps_scaling_list_data_present_flag )
            scaling_list_data( )
    }
    quant_pred_enabled_flag
    if( quant_pred_enabled_flag ) {
        quant_pred_method_idx
        quant_pred_method_parameters( )
    }
    amp_enabled_flag
    ...
    rbsp_trailing_bits( )
}
```

Table 2 below illustrates the added syntax in quant_pred_method_parameters ( ) that enables the signaling of the required parameters used in the particular advanced prediction quant_pred_method_idx. In the example embodiment illustrated in the table, three methods can be enabled (e.g., method0, method1, method2). However, other embodiments are envisioned wherein other numbers of methods can be enabled, e.g., more or less than three methods. For each method i, parameters are signaled (quant_pred_methodi_paramj), for j=0 to Ni-1, Ni being the number of parameters required for the quantization method i.

TABLE 2

```
quant_pred_method_parameters ( ) {
    if( quant_pred_method_idx = = 0 ) {
        quant_pred_method0_param0
        quant_pred_method0_param1
        ...
    }
    else if( quant_pred_method_idx = = 1 ) {
        quant_pred_method1_param0
        quant_pred_method1_param1
        ...
    }
    else {
        quant_pred_method2_param0
        quant_pred_method2_param1
        ...
    }
}
```

Table 3 below shows an example of an embodiment including a syntax element slice_quant_pred_enabled_flag at the slice level for enabling the activation or de-activation of the advanced QP prediction for the slice, when it is enabled at a higher level (e.g. at the SPS level). This may also be applied at the picture level by signaling a similar syntax element in the PPS.

TABLE 3

```
slice_segment_header( ) {
    ...
    if( !dependent_slice_segment_flag ) {
        ...
        if( quant_pred_enabled_flag ) {
            slice_quant_pred_enabled_flag
        }
        slice_qp_delta
        ...
    }
    ...
}
```

Note that other embodiments may use variations of the described examples of syntax elements and structures as shown above. For example, no flag may need to be sent, and instead, the quant_pred_method_idx may reserve a value to be used as a flag or to be enabled. More generally, any explicit signaling method may also be contemplated.

In at least one embodiment, one of the advanced prediction methods can be the Method 1 described earlier (i.e., Average luma dependent QP adaptation for HDR signal). For this case, one parameter quant_pred_methodi_param0 can be signaled to indicate the minimum block size for which the method applies to derive a QPpred value for the block. When a given block is smaller than the authorized size, the QPpred value computed for the larger block of minimum authorized dimension, to which the given block belongs, is used.

In at least one embodiment, one of the advanced prediction methods can be the Method 2 described earlier (i.e., Luma-activity dependent QP adaptation for perceptual coding). For this case, one parameter quant_pred_methodi_param0 can be signaled to indicate the value of the parameter β. Another parameter quant_pred_methodi_param1 can be signaled to indicate the value of the parameter a_pic. An additional parameter quant_pred_methodi_param1 can to be signaled to indicate the minimum block size for which the method applies to derive a QPpred value for the block, as in the previous Method 1 case.

In at least one embodiment, one of the advanced prediction methods can be the Method 3 described earlier (i.e., Position dependent QP adaptation, e.g., for a signal such as a VR360 signal). For this case, one parameter quant_pred_methodi_param0 can be signaled to control the weight variation wfact across the picture lines as follows:

$$w(y) = wfact \cdot \frac{\cos(\pi y) h}{\sum_{i \text{ from } 0...h-1} w(i)}$$

An additional parameter quant_pred_methodi_param1 can be signaled to indicate the minimum block size for which the method applies to derive a QPpred value for the block, as in the previous methods.

Figure 5:
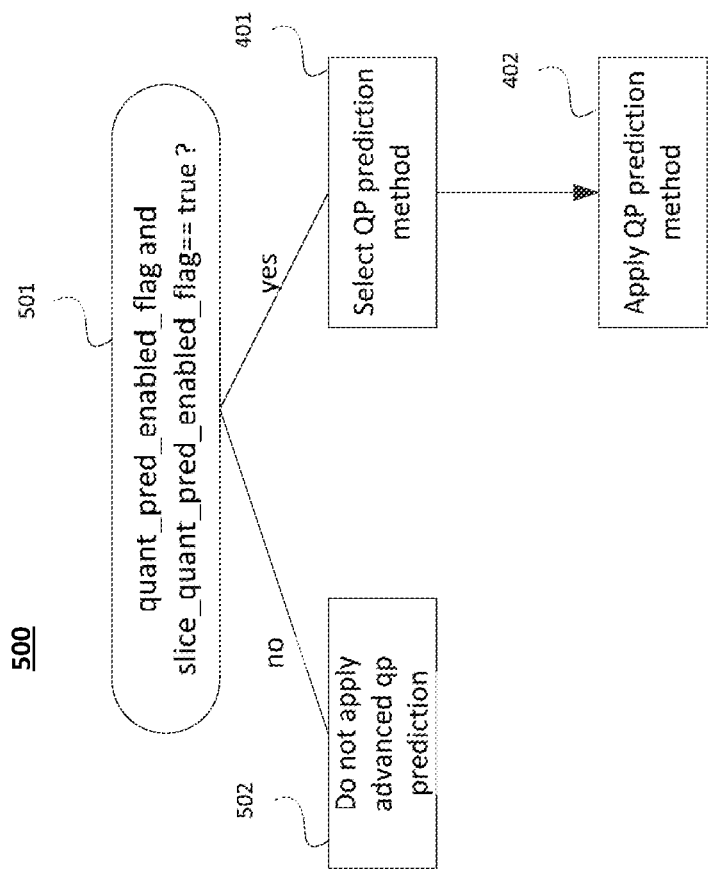
FIG. 5 illustrates another example of a method, according to an embodiment.

FIG. 5 illustrates an example of an embodiment of a corresponding decision tree 500 for at least one embodiment. The decision tree 500 may be used for deciding if advanced QP prediction applies or not for the slice.

In step 501, the flags quant_pred_enabled_flag and slice_quant_pred_enabled_flag are checked. If both are true, the selection of the advance QP prediction method is made in step 401, and the advanced QP prediction method is applied in step 402 (same as in steps 401 and 402 of FIG. 5). On the other hand, if in step 501, quant_pred_enabled_flag or slice_quant_pred_enabled_flag is false, then no advanced QP prediction is applied for the slice, as specified in step 502.

In another example of an embodiment, when advanced QP prediction is enabled, the syntax element quant_pred_method_idx may actually be inferred from the format of the signal, in which case it does not need to be signaled. For instance, when the format or characteristics of the signal are indicated in the bitstream, the advanced QP prediction method can be inferred from the format of characteristics of the signal. Current format or characteristics of the signal can be indicated in the VUI. They could be indicated in other locations, such as, for example, the SPS. In particular, the transfer function is signaled in the syntax element transfer_characteristics. For instance:
- transfer_characteristics equal to 16 indicates an HDR PQ signal;
- transfer_characteristics equal to 18 indicates an HDR HLG signal;
- otherwise an SDR signal is expected.

Another syntax element, named here vr_signal, signaled for instance in an SEI message, or in the SPS, can indicate if the signal is a VR signal.

In another example of an embodiment, the advanced QP prediction method can be identified or selected as follows:
- if the syntax element vr_signal is true, the advanced QP prediction Method 3 is selected (quant_pred_method_idx=2)
- otherwise if the transfer_characteristics is equal to 16, the advanced QP prediction Method 1 is selected (quant_pred_method_idx=0)
- otherwise if the transfer_characteristics is not equal to 16, the advanced QP prediction Method 2 is selected (quant_pred_method_idx=1)

Table 4 below illustrates some examples of transfer characteristics interpretation using transfer_characteristics syntax element in HEVC specification.

TABLE 4

Transfer characteristics interpretation using transfer_characteristics syntax element in HEVC specification.

| Value | Transfer Characteristic | | Informative Remark |
|---|---|---|---|
| 0 | Reserved | | For future use by ITU-T\| ISO/IEC |
| 1 | $V = \alpha * L_c^{0.45} - (\alpha - 1)$ | for $1 >= L_c >= \beta$ | Rec. ITU-R BT.709-6 |
|   | $V = 4.500 * L_c$ | for $\beta > L_c >= 0$ | Rec. ITU-R BT.1361-0 conventional colour gamut system (historical) (functionally the same as the values 6, 14, and 15) |
| 2 | Unspecified | | Image characteristics are unknown or are determined by the application. |
| 3 | Reserved | | For future use by ITU-T\| ISO/IEC |
| 4 | Assumed display gamma 2.2 | | Rec. ITU-R BT.470-6 System M (historical) United States National Television System Committee 1953 Recommendation for transmission standards for colour television United States Federal Communications Commission Title 47 Code of Federal Regulations (2003) 73.682 (a) (20) Rec. ITU-R BT.1700 (2007 revision) 625 PAL and 625 SECAM |
| 5 | Assumed display gamma 2.8 | | Rec. ITU-R BT.470-6 System B, G (historical) |

TABLE 4-continued

Transfer characteristics interpretation using transfer_characteristics syntax element in HEVC specification.

| Value | Transfer Characteristic | | Informative Remark |
|---|---|---|---|
| 6 | $V = \alpha * L_c^{0.45} - (\alpha - 1)$ <br> $V = 4.500 * L_c$ | for $1 >= L_c >= \beta$ <br> for $\beta > L_c >= 0$ | Rec. ITU-R BT.601-6 525 or 625 <br> Rec. ITU-R BT.1358-1 525 or 625 (historical) <br> Rec. ITU-R BT.1700 NTSC Society of Motion Picture and Television Engineers 170M (2004) <br> (functionally the same as the values 1, 14, and 15) |
| 7 | $V = \alpha * L_c^{0.45} - (\alpha - 1)$ <br> $V = 4.0 * L_c$ | for $1 >= L_c >= \beta$ <br> for $\beta > L_c >= 0$ | Society of Motion Picture and Television Engineers 240M (1999) |
| 8 | $V = L_c$ | for all values of $L_c$ | Linear transfer characteristics |
| 9 | $V = 1.0 + Log10(L_c) \div 2$ <br> $V = 0.0$ | for $1 >= L_c >= 0.01$ <br> for $0.01 > L_c >= 0$ | Logarithmic transfer characteristic (100:1 range) |
| 10 | $V = 1.0 + Log10(L_c) \div 2.5$ <br> $V = 0.0$ | for $1 >= L_c >=$ Sqrt(10) $\div 1000$ <br> for Sqrt(10) $\div 1000 > L_c >= 0$ | Logarithmic transfer characteristic (100 * Sqrt(10):1 range) |
| 11 | $V = \alpha * L_c^{0.45} - (\alpha - 1)$ <br> $V = 4.500 * L_c$ <br> $V = -\alpha * (-L_c)^{0.45} + (\alpha - 1)$ | for $L_c >= \beta$ <br> for $\beta > L_c > -\beta$ <br> for $-\beta >= L_c$ | IEC 61966-2-4 |
| 12 | $V = \alpha * L_c^{0.45} - (\alpha - 1)$ <br> $V = 4.500 * L_c$ <br> $V = -(\alpha * (-4 * L_c)^{0.45} - (\alpha - 1)) \div 4$ | for $1.33 > L_c >= \beta$ <br> for $\beta > L_c >= -\gamma$ <br> for $-\gamma > L_c >= -0.25$ | Rec. ITU-R BT.1361-0 extended colour gamut system (historical) |
| 13 | $V = \alpha * L_c(1 \div 2.4) - (\alpha - 1)$ <br> $V = 12.92 * L_c$ | for $1 >= L_c >= \beta$ <br> for $\beta > L_c >= 0$ | IEC 61966-2-1 sRGB or sYCC |
| 14 | $V = \alpha * L_c^{0.45} - (\alpha - 1)$ <br> $V = 4.500 * L_c$ | for $1 >= L_c >= \beta$ <br> for $\beta > L_c >= 0$ | Rec. ITU-R BT.2020-2 (functionally the same as the values 1, 6, and 15) |
| 15 | $V = \alpha * L_c^{0.45} - (\alpha - 1)$ <br> $V = 4.500 * L_c$ | for $1 >= L_c >= \beta$ <br> for $\beta > L_c >= 0$ | Rec. ITU-R BT.2020-2 (functionally the same as the values 1, 6, and 14) |
| 16 | $V = ((c_1 + c_2 * L_o^n) \div (1 + c_3 * L_o^n))^m$ <br> $c_1 = c_3 - c_2 + 1 = 3424 \div 4096 = 0.8359375$ <br> $c_2 = 32 * 2413 \div 4096 = 18.8515625$ <br> $c_3 = 32 * 2392 \div 4096 = 18.6875$ <br> $m = 128 * 2523 \div 4096 = 78.84375$ <br> $n = 0.25 * 2610 \div 4096 = 0.1593017578125$ <br> for which $L_o$ equal to 1 for peak white is ordinarily intended to correspond to a reference output luminance level of 10 000 candelas per square metre | for all values of $L_o$ | Society of Motion Picture and Television Engineers ST 2084 for 10, 12, 14, and 16-bit systems |
| 17 | $V = (48 * L_o \div 52.37)^{(1 \div 2.6)}$ <br> for which $L_o$ equal to 1 for peak white is ordinarily intended to correspond to a reference output luminance level of 48 candelas per square metre | for all values of $L_o$ | Society of Motion Picture and Television Engineers ST 428-1 |
| 18 | $V = a * Ln(12 * L_c - b) + c$ <br> $V = Sqrt(3) * L_c^{0.5}$ <br> $a = 0.17883277, b = 0.28466892, c = 0.55991073$ | for $1 >= L_c > 1 \div 12$ <br> for $1 \div 12 >= L_c >= 0$ | Association of Radio Industries and Businesses (ARIB) STD-B67 |
| 19 ... 255 | Reserved | | For future use by ITU-T\|ISO/IEC |

Figure 9:
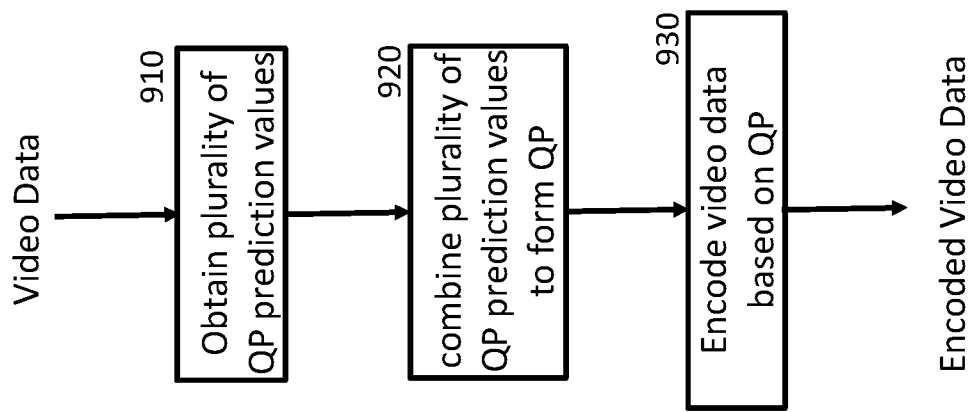
FIG. 9 illustrates an example of a flow diagram according to an embodiment.

In at least one embodiment, a plurality of QP prediction processes can be combined or cascaded. An example of an embodiment for encoding based on combining is illustrated in FIG. 9. In FIG. 9, a plurality of QP prediction values is obtained at 910. As described previously, QP prediction methods can be explicitly signaled using the syntax element. For example, in at least one embodiment, various examples of QP prediction processes that can be enabled or available for combining or cascading can include three methods designated method0, method1 and method2 that can, e.g., in at least one embodiment, correspond to three QP prediction methods described above: Method 1 (QP adaptation based on the value of luma samples), Method 2 (QP adaptation based on an activity such as luma activity), and Method 3 (QP adaptation based on a spatially adaptive quantization). The syntax element quant_pred_method_idx can be interpreted as follows:

if quant_pred_method_idx is equal to 0, method0 applies;
else if quant_pred_method_idx is equal to 1, method1 applies;
else if quant_pred_method_idx is equal to 2, method2 applies;
else if quant_pred_method_idx is equal to 3, method0 and method1 are combined;
else if quant_pred_method_idx is equal to 4, method0 and method2 are combined;
else if quant_pred_method_idx is equal to 5, method1 and method2 are combined.

In an example of combining of (k+1) advanced QP prediction methods, corresponding QPpred values, QPpred_0 . . . QPpred_k are derived, and the actual final QPpred, or referred to simply as QP in FIG. 9, is obtained by combining these different values as indicated at 920 in FIG. 9, e.g., computed as the sum of these different values:

$$QPpred = QPpred\_0 + QPpred\_1 + \ldots + QPpred\_k$$

The multiple QPpred values can be obtained successively, e.g., by successive processing using each of the plurality of QP prediction processing approaches and successively summing the QPpred value produced by each prediction process. This can be referred to as cascading of the plurality of QP prediction approaches. Then, at 930 in FIG. 9, video data can be encoded based on the QP value produced by the combining of the various prediction values at 920.

Figure 10:
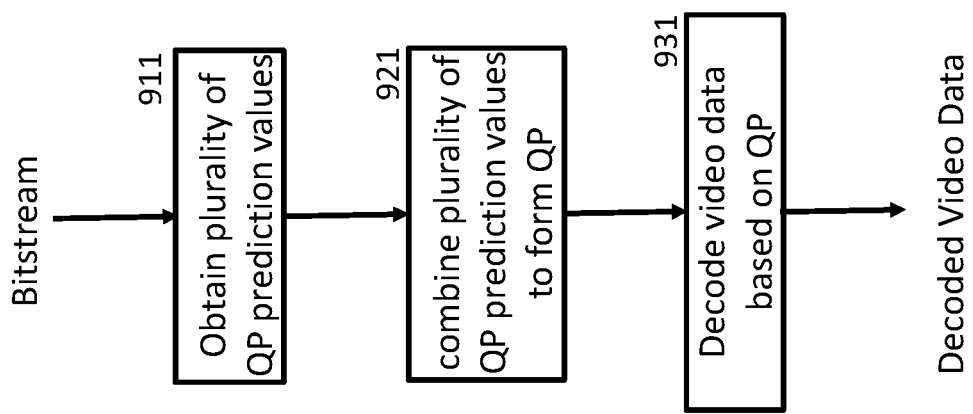
FIG. 10 illustrates an example of a flow diagram according to an embodiment.

FIG. 10 illustrates an example of an embodiment of decoding that can proceed in a manner similar to that described in regard to FIG. 9 for encoding.

Combining or cascading can also be decided based on the signal characteristics. An example is illustrated below.

A first value QPpred0 is derived based on the syntax element vr_signal:
  if the syntax element vr_signal is true, QPpred0 is derived from the advanced QP prediction Method 3,
  otherwise QPpred0 is set to 0.

A second value QPpred1 is derived based on the syntax element transfer_characteristics, as illustrated below:
  if the transfer_characteristics is equal to 16, QPpred1 is derived from the advanced QP prediction Method 1,
  otherwise if the transfer_characteristics is not equal to 16, QPpred1 is derived from the advanced QP prediction Method 2.

The final QPpred is derived as the sum of QPpred0 and QPpred1.

Figure 11:
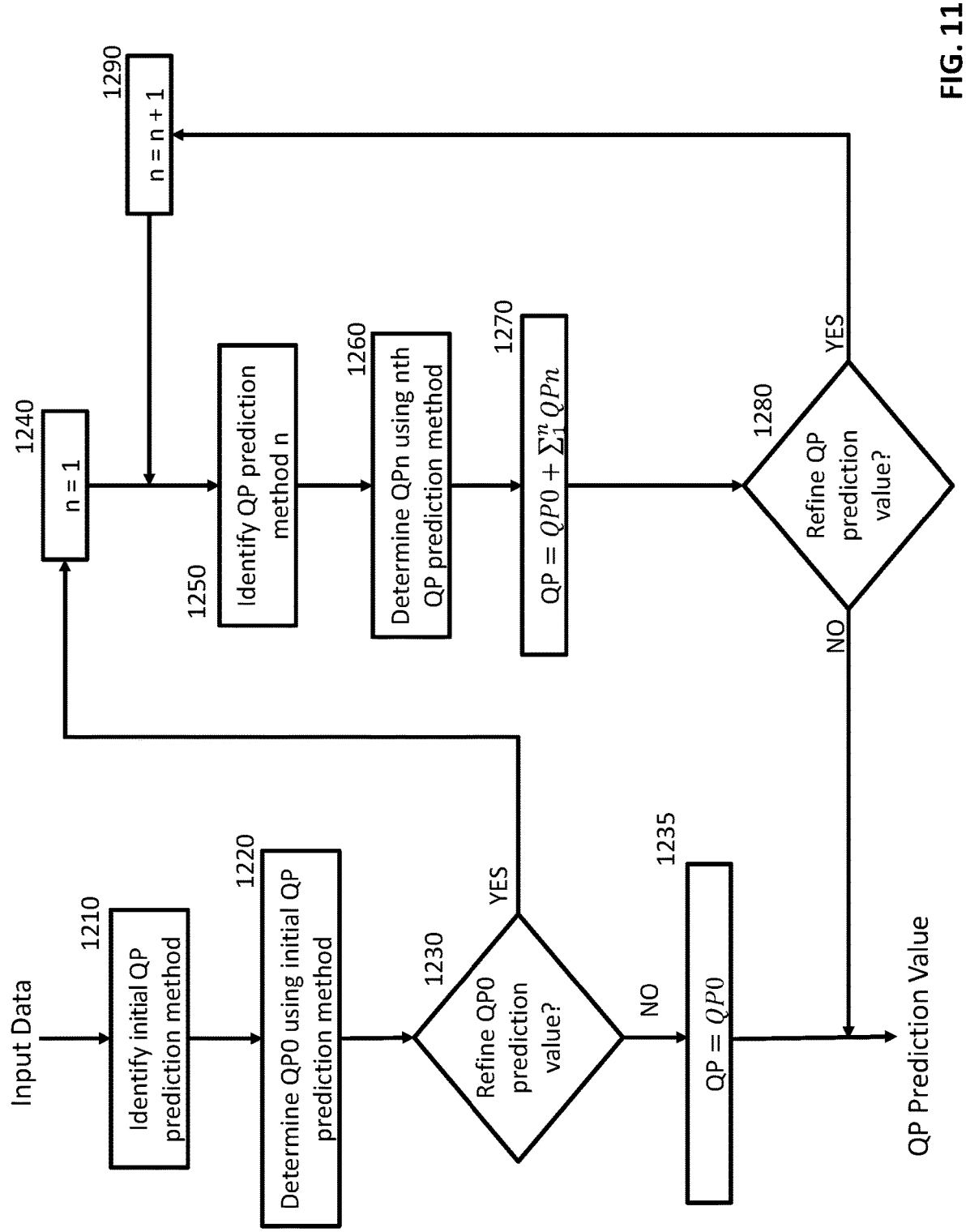
FIG. 11 illustrates an example of a flow diagram according to an embodiment.

An example of at least one embodiment involving combining or cascading of QP prediction processes will be explained in more detail with reference to FIG. 11. At 1210 in FIG. 11, QP processing for a block or current CU begins by identifying a first or initial QP prediction process from the input data, e.g., based on characteristics of the current block, the content and/or syntax in the bitstream. The first QP prediction approach can be a process such as one described above in paragraph [31] involving predicting the QP value from the QP values of the neighboring top and left CUs, or group of CUs, surrounding the current CU. This initial prediction method is used at 1220 to determine a first or initial QP prediction value designated QP0. Next, at 1230, the system determines whether to refine the initial QP prediction value. This determination can occur based, e.g., on syntax in the bitstream, characteristics of the content such as the content including HDR content. If the determination at 1230 is "no" then the initial QP0 value is output as the QP prediction value (step 1235). If the determination at 1230 is "yes" then refinement of the initial QP0 value begins at 1240 where an index "n" is set to 1. At 1250, another or $n^{th}$ QP prediction method is identified, e.g., by syntax in the bitstream. At 1260, the $n^{th}$ QP prediction method produces another QP prediction value designated QPn that may be used to provide a refinement of the initial QP0 value. The $n^{th}$ QP prediction process can be, e.g., an advanced QP prediction method as described above, e.g., in paragraphs [33], or [34] or [35]. In an embodiment, the QPn prediction value can comprise a differential or delta QP value that can be combined with the first or initial QP prediction value QP0 to produce a combined QP prediction value that includes a refinement with respect to the initial QP0 value. In an embodiment, producing the combined QP prediction value can involve summing the initial QP0 value and one or more QPn values as in 1270 of FIG. 11. A first refinement value produced at 1260 can be represented as QP1 in which case a combination of QP0 and QP1 to produce the QP prediction value can be:

$$QP = QP0 + QP1$$

In an embodiment, additional refinements may be desirable where each can be based on a respective QP prediction method. A check for further or additional refinement occurs at 1280, e.g., checking syntax, content type, etc. If no further refinement is indicated ("no" at 1280) then the current QP prediction value produced at 1270 is output as the QP prediction value. If further refinement is to be provided ("yes" at 1280) then the index "n" is incremented at 1290 and 1250 through 1280 are repeated to produce a $QP_{n+1}$. In the case of multiple refinements (multiple iterations of 1250 through 1290), each refinement value can be produced using a respective one of a plurality of QP prediction methods. Each refinement value can be a differential value as described above. For multiple refinement values, the combination obtained at 1270 can involve summing all refinement values QP1 through QPn and adding the sum to the initial QP0 value to produce the QP prediction value. For example, for two refinements based on two QP prediction methods, the combination to produce the overall QP prediction value can be:

$$QP = QP0 + QP1 + QP2$$

The addition of a delta QP values such as QP1 and QP2 implements a combining or cascading of QP prediction approaches that provides an adjustment, modification or refinement of the initial QP prediction value QP0 to improve the QP prediction results. The described combining or cascading of QP prediction processes using one or more additional QP prediction methods, e.g., advance QP prediction methods, to refine an initial QP prediction value produced by, e.g., a convention QP prediction method, has the effect of modulating the initial QP prediction value.

At least one embodiment of the described example of combining or cascading of QP prediction processes can involve the following. First, an initial QP prediction value can be determined that may be, for example, a QP0 value that is a "global" value for an entire picture. This initial, global QP0 value can be signaled in the stream. Then, the described refinement of QP0 can occur based on one or more parameters or characteristics of a picture portion or video content included in the stream. For example, refinement of QP0 may be based on a type of content, e.g., type of content signaled in the bitstream or inferred from syntax elements included in the bitstream. As a more specific example, consider content that can be HDR and/or VR360 content. For HDR content, a delta QP value (dQP1) can be determined for each block, e.g., inferred, from an average value of the luma prediction block. In addition, for example, if the HDR content is also VR360, a second delta QP value (dQP2) can be determined, e.g., inferred, from the position of the block in the picture. Then, the final QP value applied to the block can be:

$$QP = QP0 + dQP1 + dQP2$$

Figure 6:
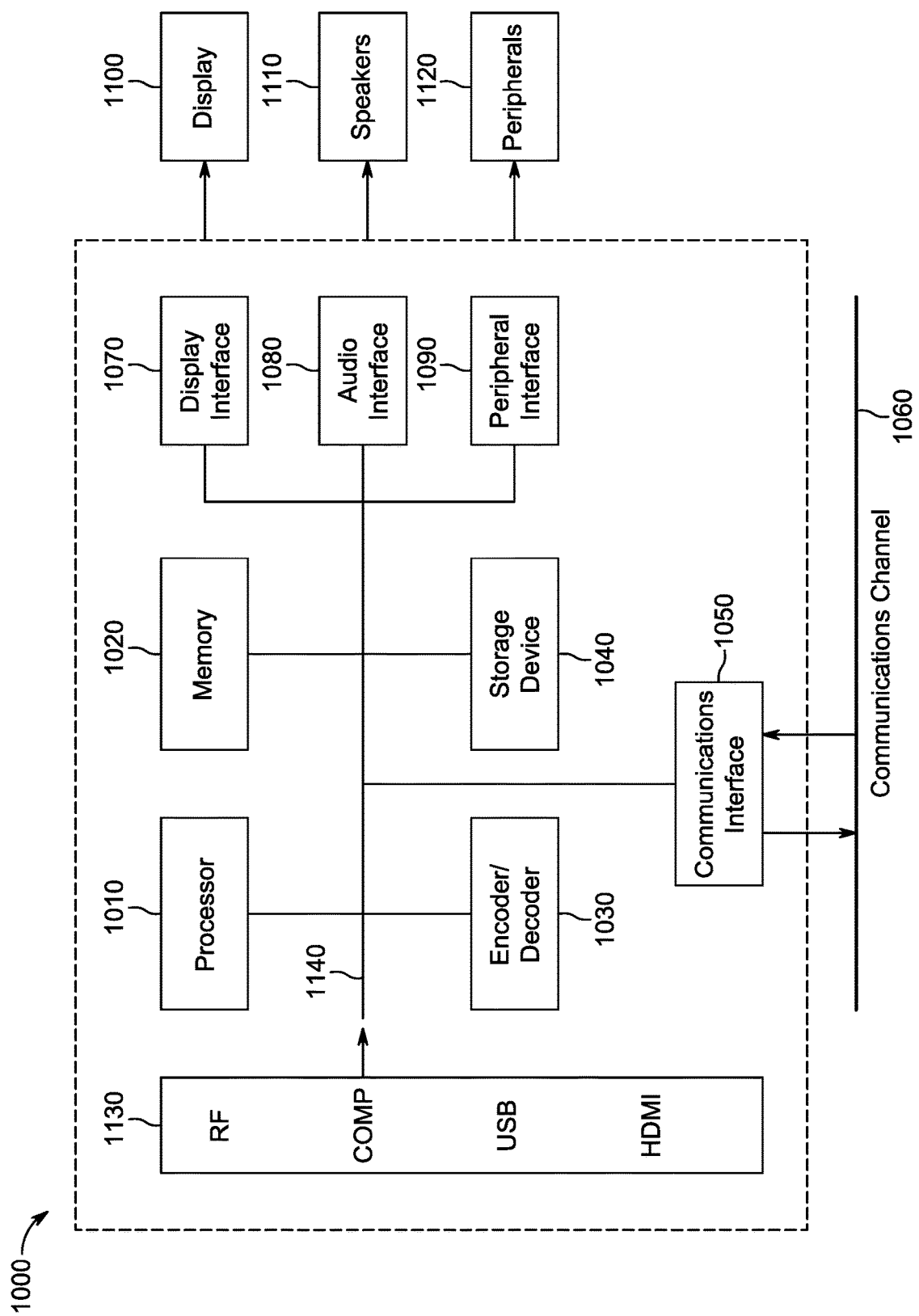
FIG. 6 illustrates a block diagram of an example of an embodiment of apparatus in which various aspects and features in accordance with the present disclosure may be implemented.

FIG. 6 illustrates a block diagram of an example of a system in which various aspects and embodiments are implemented. The system illustrated in FIG. 6 can be embodied as a device including the various components described below and configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. In the example of an embodiment of a system shown in FIG. 6, certain features or elements are illustrated grouped together inside block 1000 drawn in phantom. The grouping of elements to form block 1000 is merely for ease of description and illustration of an example of an embodiment. Various other groupings of the elements shown in FIG. 6 are envisioned either in the example embodiment shown in FIG. 6 or in other embodiments. In FIG. 6, block 1000 can interface or interacts with various peripheral devices such as display 1100, audio speakers 1110 and other peripheral devices 1120 as will be described in more detail below. Features illustrated in FIG. 6 as being within group 1000 can be embodied, singly or in combination, in a single integrated circuit (IC), multiple ICs, and/or discrete components. For example, in at least one embodiment, the processing and encoder/decoder elements of group 1000 are distributed across multiple ICs and/or discrete components. In various embodiments, the features included in group 1000 can be communicatively coupled to other similar systems, or to other electronic devices, via, for example, a communications bus such as communications channel 1060 or through dedicated input and/or output ports. In various embodiments, the system of FIG. 6 can be configured to implement one or more of the aspects described in this document.

The features of group 1000 can include at least one processor such as processor 1010 configured to execute instructions loaded therein for implementing, for example, the various aspects described in this document. Processor 1010 can include embedded memory, input output interface, and various other circuitries as known in the art. Although illustrated as a single block 1010, the functionality of processor 1010 can be implemented using multiple processors. The features of block 1000 can include at least one memory 1020 (e.g., a volatile memory device, and/or a non-volatile memory device) and/or other memory devices such as storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

The features of block 1000 can include an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of the system shown in FIG. 6 rather than being included in block 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is used during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

One or more inputs to the elements of the system shown in FIG. 6 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting the system of FIG. 6 to other electronic devices across USB and/or HDMI connections. It is to be understood that various aspects of input processing, for example, Reed-Solomon error correction, can be implemented, for example, within a separate input processing IC or within processor 1010 as needed. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of the system of FIG. 6 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system of FIG. 6 can include communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data can be provided, e.g., can be streamed, to the system of FIG. 6, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments can be connected to an access point or router that provides access to outside networks including the Internet for allowing streaming applications and other over-the-top communications. Other embodiments can provide streamed data to the system FIG. 6 using a set-top box that delivers the data over the HDMI connection of the input block 1130. Still other embodiments provide streamed data to the system 1000 using the RF connection of the input block 1130.

Block 1000 can provide an output signal to various output devices, including a display 1100, speakers 1110, and/or other peripheral devices 1120. The other peripheral devices 1120 include, in various examples of embodiments, one or more of a stand-alone DVR, a disk player, a stereo system, a lighting system, and other devices that provide a function based on the output of the system. In various embodiments, control signals are communicated between block 1000 and the display 1100, speakers 1110, or other peripheral devices 1120 using signaling such as AV.Link, CEC, or other communications protocols that enable device-to-device control with or without user intervention. The output devices can be communicatively coupled to block 1000 via dedicated connections through respective interfaces 1070, 1080, and 1090. Alternatively, the output devices can be connected to block 1000 using the communications channel 1060 via the communications interface 1050. The display 1100 and speakers 1110 can be integrated in a single unit with the other components of the system shown in FIG. 6 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

One or more embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 7:
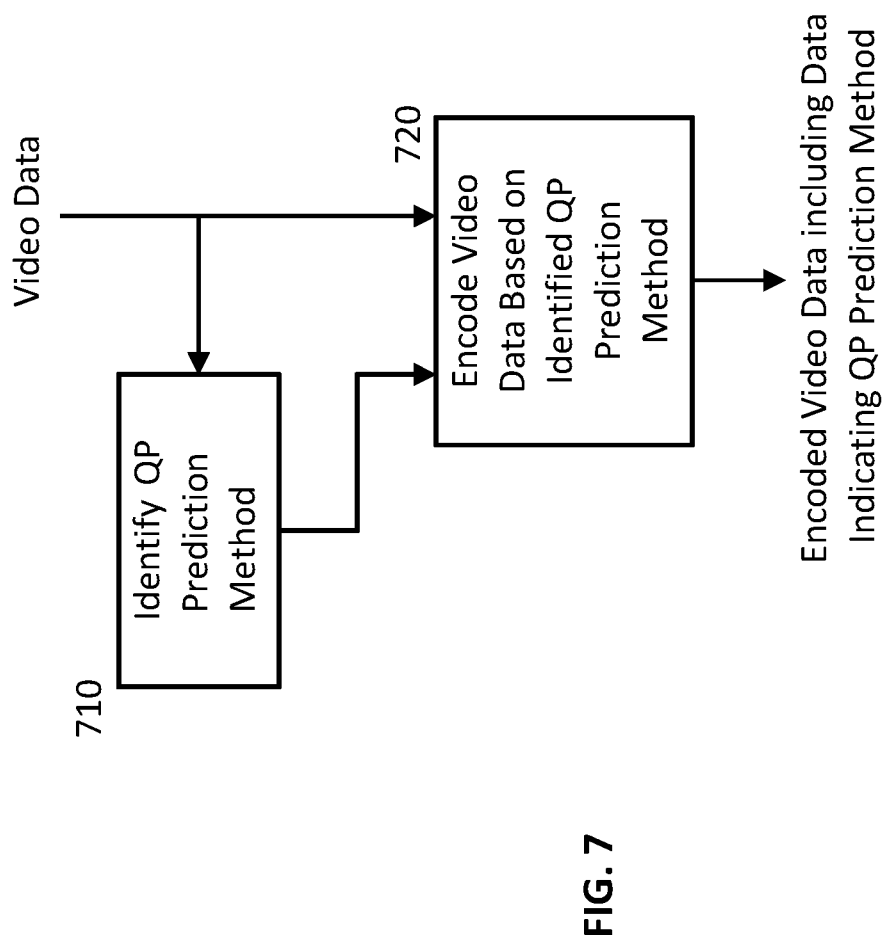
FIG. 7 illustrates a block diagram of an example of an embodiment of a video encoder.

Another example of an embodiment is shown in FIG. 7 which a method for providing QP prediction, e.g., in an encoder. In FIG. 7, video data such as data included in a digital video signal or bitstream is processed at 710 to identify a QP prediction method, e.g., one of a plurality of available methods. Identification of a method at 710 may occur based on any of various approaches such as one or more of those described above, e.g., based on signal type (such as SDR, HDR, etc.), syntax information in the bitstream, etc. The method identified at 710 is communicated to 720 where the video data is encoded. That is, the video data is processed at 720 to encode the video data, e.g., as described above in regard to an embodiment such as that shown in FIG. 1 or FIG. 6, where the encoding can be based on the QP prediction method identified at 710. Encoded video data is output from 720 and can include data or information indicating the QP prediction method used for encoding such as the examples of QP prediction indication described above (e.g., syntax, signal characteristics or type).

Figure 8:
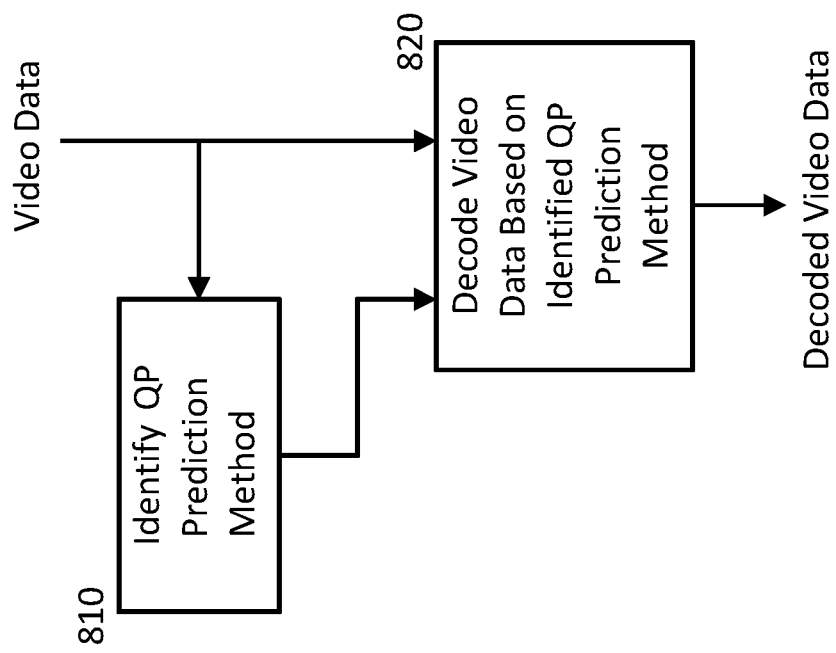
FIG. 8 illustrates a block diagram of an example of an embodiment of a video decoder.

FIG. 8 shows an example of an embodiment of a method for decoding video data. The encoded video data, e.g., digital data signal or bitstream, is processed at 810 to identify a QP prediction method used during encoding of the video data. The identification can occur in a manner such as one of those described above, e.g., based on a type of signal, signal characteristics and/or syntax. The method identified is communicated to 820 where decoding of the video data occurs. Processing of the encoded video data at 820, e.g., as described above in regard to an embodiment such as that shown in FIG. 3 or FIG. 6, decodes the encoded video data based on the QP prediction method identified at 810. Decoded video data is output from 820.

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Embodiments described and contemplated in this document may be implemented in many different forms. For example, FIGS. 1, 3 and 6 described herewith provide some examples of hardware related embodiments, but other embodiments are contemplated and the discussions of these and other figures do not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are also described herewith, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the mode difference threshold for switching on/off blended intra prediction, and the constants used in the weight calculation equations. It should be noted that the specific values are merely examples and the present embodiments are not limited to these specific values.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" can be involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Embodiments may include any of the following features or entities, alone or in any combination, across various different claim categories and types:

Modifying the dQP/QP prediction process applied in the decoder and/or encoder.

Enabling several advanced QP prediction methods in the decoder and/or encoder.

Inserting in the signaling syntax elements that enable the decoder to identify the QP prediction method to use.

Selecting, based on these syntax elements, the QP prediction method to apply at the decoder.

Applying the QP prediction method for deriving the QP at the decoder.

A bitstream or signal that includes one or more of the described syntax elements, or variations thereof.

Creating and/or transmitting and/or receiving and/or decoding a bitstream or signal that includes one or more of the described syntax elements, or variations thereof.

Various other generalized, as well as particularized, embodiments are also supported and contemplated throughout this disclosure. For example, In an embodiment, an apparatus for encoding video data is presented, comprising at least a memory and one or more processors, wherein the one or more processors are configured to: identify or obtain at least one of a plurality of quantization parameter prediction methods to use to encode the video data; and encode the video data to produce encoded video data based on the at least one quantization parameter prediction method, wherein the encoded video data include data indicating the at least one quantization parameter prediction method used to produce the encoded video data.

According to another embodiment, a method for encoding video data is presented, comprising: identifying or obtaining at least one of a plurality of quantization parameter prediction methods to use to encode the video data; and encoding the video data based on the at least one quantization parameter prediction method, wherein the encoded video data include data indicating the at least one quantization parameter prediction method used to encode the video data.

According to another embodiment, an apparatus for decoding video data is presented, comprising at least a memory and one or more processors, wherein the one or more processors are configured to: access the video data; identify or obtain at least one of a plurality of quantization parameter prediction methods indicated in the video data to use to decode the video data; and decode the video data to obtain the decoded video data based on the at least one quantization parameter prediction method indicated in the video data.

According to another embodiment, a method for decoding video data is presented comprising accessing the video data; identifying or obtaining at least one of a plurality of quantization parameter prediction methods indicated in the video data to use to decode the video data; and decoding the encoded video data to obtain the decoded video data based on the at least one quantization parameter prediction method indicated in the video data.

According to another embodiment, an apparatus for encoding video data is presented comprising at least a memory and one or more processors, wherein the one or more processors are configured to: obtain a plurality of quantization parameter prediction values, each corresponding to a respective one of a plurality of quantization parameter prediction methods; obtain a predicted value of a quantization parameter based on a combination of the plurality of quantization parameter prediction values, and encode the video data to produce encoded video data based on the predicted value of the quantization parameter, wherein the encoded video data includes data indicating the combination of the plurality of quantization parameter prediction values.

According to another embodiment, a method for encoding video data is presented comprising obtaining a plurality of quantization parameter prediction values, each corresponding to a respective one of a plurality of quantization parameter prediction methods; obtaining a predicted value of a quantization parameter based on a combination of the plurality of quantization parameter prediction values, and encoding the video data to produce encoded video data based on the predicted value of the quantization parameter, wherein the encoded video data includes data indicating the combination of the plurality of quantization parameter prediction values.

According to another embodiment, an apparatus for decoding video data is presented comprising at least a memory and one or more processors, wherein the one or more processors are configured to: access the video data; identify a plurality of quantization parameter prediction methods indicated in the video data; obtain a plurality of quantization parameter prediction values, each corresponding to a respective one of the plurality of quantization parameter prediction methods; obtain a predicted value of a quantization parameter based on a combination of the plurality of quantization parameter prediction values, and decode the video data to produce encoded video data based on the predicted value of the quantization parameter.

According to another embodiment, a method for decoding video data is presented comprising accessing the video data; identifying a plurality of quantization parameter prediction methods indicated in the video data; obtaining a plurality of quantization parameter prediction values, each corresponding to a respective one of the plurality of quantization parameter prediction methods; obtaining a predicted value of a quantization parameter based on a combination of the plurality of quantization parameter prediction values, and decoding the video data to produce encoded video data based on the predicted value of the quantization parameter.

According to another embodiment a bitstream is presented formatted to include encoded video data, wherein the encoded video data are encoded by: obtaining a plurality of quantization parameter prediction values, each corresponding to a respective one of a plurality of quantization parameter prediction methods; obtaining a predicted value of a quantization parameter based on a combination of the plurality of quantization parameter prediction values, and encoding the video data to produce encoded video data based on the predicted value of the quantization parameter, wherein the encoded video data includes data indicating the combination of the plurality of quantization parameter prediction values.

According to another embodiment, the plurality of quantization parameter prediction methods comprise at least: an average luma dependent quantization parameter adaptation method, a luma activity dependent quantization parameter adaptation method, or a position dependent quantization parameter adaptation method.

According to another embodiment, the plurality of quantization parameter prediction methods include a method based on a combination of two or more of the quantization parameter adaptation methods.

According to another embodiment, the combination is formed by: performing the two or more of the quantization parameter adaptation methods to produce two or more respective quantization parameter prediction values; and combining the two or more respective quantization parameter prediction values to produce a final quantization parameter prediction value.

According to another embodiment, the combination is formed by successively performing the two or more quantization parameter adaptation methods to produce a final quantization parameter prediction value.

According to another embodiment, the at least one quantization parameter prediction methods is based on at least a syntax element and a format of video included in the video data.

According to another embodiment, the format of video comprises one or more video formats of standard dynamic range (SDR), high dynamic range (HDR), and virtual reality 360° equirectangular projection (VR360 ERP).

According to another embodiment, the at least one quantization parameter prediction methods is selected based on a syntax element indicating whether video being encoded or decoded is a virtual reality signal and a syntax element indicating a transfer function of the video being encoded or decoded.

According to another embodiment, a bitstream is formatted to include encoded video data, wherein the encoded video data are encoded by: identify or obtain at least one of a plurality of quantization parameter prediction methods to use to encode the video data; and encode the video data to produce encoded video data based on the at least one quantization parameter prediction method, wherein the encoded video data include data indicating the at least one quantization parameter prediction method used to produce the encoded video data.

In general, at least one embodiment of an apparatus or method for either encoding or decoding video data can comprise applying a local QP adaptation based on the value of luma samples wherein the local QP adaptation can include obtaining an average luma value for a block using an original signal or a prediction signal; and adding a delta QP value that depends on the average luma value to the QP specified for a slice. In at least one embodiment, the delta QP value may be obtained from a table of delta QP values per range of luma values.

In general, at least one embodiment of an apparatus or method for either encoding or decoding video data can comprise obtaining a delta QP value based on a weighting value, wherein the weighting value is based on a luma activity of a block or an area to which the block belongs.

In general, at least one embodiment of an apparatus or method for either encoding or decoding video data can comprise a spatially adaptive quantization. In at least one embodiment, the spatially adaptive quantization may be applied for a category of content, wherein the category of content comprises virtual reality equirectangular projection content; and a QP value is obtained based on a CU's location; and a QP value is obtained for each CU based on a weight used to compute a weighted spherical peak signal to noise ratio.

One or more of the present embodiments also provide a computer readable storage medium having stored thereon instructions for encoding or decoding video data according to the methods or the apparatuses described herewith. The present embodiments also provide a computer readable storage medium having stored thereon a bitstream generated according to the methods or the apparatuses described herewith. The present embodiments also provide methods and apparatuses for transmitting or receiving the bitstream generated according to methods or the apparatuses described herewith.

The invention claimed is:

1. An apparatus for encoding video data comprising:
one or more processors, wherein the one or more processors are configured to:
select at least one quantization parameter prediction method from a plurality of quantization parameter prediction methods for predicting a quantization parameter for a block of a picture of a video based on a format of the video, wherein the format of video comprises one or more video formats of standard dynamic range, high dynamic range, or virtual reality video;
determine a predicted value of the quantization parameter for the block based on the selected at least one quantization parameter prediction method, wherein if more than one quantization parameter prediction methods are selected, the one or more processors are further configured to:
obtain a first quantization parameter prediction value based on a first selected quantization parameter prediction method,
obtain a second quantization parameter prediction value based on a second selected quantization parameter prediction method, and
obtain a refined quantization parameter prediction value based on a combination of the first quantization parameter prediction value and the second quantization parameter prediction value, wherein the predicted value of the quantization parameter for the block is determined based on the refined quantization parameter prediction value; and
encode the video data based on the predicted value of the quantization parameter to produce encoded video data, wherein the video data further comprises a syntax element, and wherein the syntax element indicates the format of the video.

2. A method for encoding video data comprising:
selecting at least one quantization parameter prediction method from a plurality of quantization parameter prediction methods for predicting a quantization parameter for a block of a picture of a video based on a format of the video, wherein the format of video comprises one or more video formats of standard dynamic range, high dynamic range, or virtual reality video;
determining a predicted value of the quantization parameter for the block based on the selected at least one quantization parameter prediction method, wherein if more than one quantization parameter prediction methods are selected, the method further comprises:
obtaining a first quantization parameter prediction value based on a first selected quantization parameter prediction method,
obtaining a second quantization parameter prediction value based on a second selected quantization parameter prediction method, and
obtaining a refined quantization parameter prediction value based on a combination of the first quantization parameter prediction value and the second quantization parameter prediction value, wherein the predicted value of the quantization parameter for the block is determined based on the refined quantization parameter prediction value; and
encoding the video data based on the predicted value of the quantization parameter to produce encoded video data wherein the video data further comprises a syntax element, and wherein the syntax element indicates the format of the video.

3. An apparatus for decoding video data comprising:
one or more processors, wherein the one or more processors are configured to:
obtain at least one quantization parameter prediction method of a plurality of quantization parameter prediction methods for predicting a quantization parameter for a block of a picture of a video based on a format of the video, wherein the format of video comprises one or more of standard dynamic range, high dynamic range, or virtual reality, and wherein the format of the video is determined based on at least one syntax element in the video data;
determine a predicted value of the quantization parameter for the block based on the obtained at least one quantization parameter prediction method, wherein if more than one quantization parameter perdition methods are obtained, the one or more processors are configured to:
obtain a first quantization parameter prediction value based on a first obtained quantization parameter prediction method,
obtain a second quantization parameter prediction value based on a second obtained quantization parameter prediction method, and
obtain a refined quantization parameter prediction value based on a combination of the first quantization parameter prediction value and the second quantization parameter prediction value, wherein the predicted value of the quantization parameter for the block is determined based on the refined quantization parameter prediction value; and
decode the video data to produce decoded video data based on the predicted value of the quantization parameter.

4. A method for decoding video data comprising:
obtaining at least one quantization parameter prediction method of a plurality of quantization parameter prediction methods for predicting a quantization parameter for a block of a picture of a video based on a format of the video, wherein the format of video comprises one or more of standard dynamic range, high dynamic range, or virtual reality, and wherein the format of the video is determined based on at least one syntax element in the video data:
determining a predicted value of the quantization parameter for the block based on the obtained at least one quantization parameter prediction method, wherein if more than one quantization parameter prediction methods are obtained, the method further comprises:
obtaining a first quantization parameter prediction value based on a first obtained quantization parameter prediction method,
obtaining a second quantization parameter prediction value based on a second obtained quantization parameter prediction method, and
obtaining a refined quantization parameter prediction value based on a combination of the first quantization parameter prediction value and the second quantization parameter prediction value, wherein the predicted value of the quantization parameter for the block is determined based on the refined quantization parameter prediction value decoding the video data to produce decoded video data based on the predicted value of the quantization parameter.

5. The apparatus of claim 1, wherein the plurality of quantization parameter prediction methods comprises at least one of:
an average luma dependent quantization parameter adaptation method, a luma activity dependent quantization parameter adaptation method, or a position dependent quantization parameter adaptation method.

6. The apparatus of claim 1, wherein the one or more processors are further configured to:
include an indication in the video data, wherein the indication indicates the plurality of quantization parameter prediction methods.

7. The method of claim 2, wherein the plurality of quantization parameter prediction methods comprises at least one of:
an average luma dependent quantization parameter adaptation method, a luma activity dependent quantization parameter adaptation method, or a position dependent quantization parameter adaptation method.

8. The method of claim 2, further comprising:
including an indication in the video data, wherein the indication indicates the plurality of quantization parameter prediction methods.

9. A non-transitory computer readable medium storing computing instructions for encoding video data, the instructions causing one or more processors to perform:
selecting at least one quantization parameter prediction method from a plurality of quantization parameter prediction methods for predicting a quantization parameter for a block of a picture of a video based on a format of the video, wherein the format of video comprises one or more video formats of standard dynamic range, high dynamic range, or virtual reality video;
determining a predicted value of the quantization parameter for the block based on the selected at least one quantization parameter prediction method, wherein if more than one quantization parameter prediction methods are selected, the method further comprises:
obtaining a first quantization parameter prediction value based on a first selected quantization parameter prediction method,
obtaining a second quantization parameter prediction value based on a second selected quantization parameter prediction method, and
obtaining a refined quantization parameter prediction value based on a combination of the first quantization parameter prediction value and the second quantization parameter prediction value, wherein the predicted value of the quantization parameter for the block is determined based on the refined quantization parameter prediction value; and
encoding the video data based on the predicted value of the quantization parameter to produce encoded video data, wherein the video data further comprises a syntax element, and wherein the syntax element indicates the format of the video.

10. The apparatus of claim 3, wherein the plurality of quantization parameter prediction methods comprises at least one of:
an average luma dependent quantization parameter adaptation method, a luma activity dependent quantization parameter adaptation method, or a position dependent quantization parameter adaptation method.

11. The apparatus of claim 3, wherein the one or more processors are configured to:
obtain an indication in the video data, wherein the indication indicates the plurality of quantization parameter prediction methods.

12. The method of claim 4, wherein the plurality of quantization parameter prediction methods comprises at least one of:
an average luma dependent quantization parameter adaptation method, a luma activity dependent quantization parameter adaptation method, or a position dependent quantization parameter adaptation method.

13. The method of claim 4, further comprising:
obtaining an indication in the video data, wherein the indication indicates the plurality of quantization parameter prediction methods.

14. A non-transitory computer readable medium storing computing instructions for decoding video data, the instructions causing one or more processors to perform:
obtaining at least one quantization parameter prediction method of a plurality of quantization parameter prediction methods for predicting a quantization parameter for a block of a picture of a video based on a format of the video, wherein the format of video comprises one or more of standard dynamic range, high dynamic range, or virtual reality, and wherein the format of the video is determined based on at least one syntax element in the video data;
determining a predicted value of the quantization parameter for the block based on the obtained at least one quantization parameter prediction method, wherein if more than one quantization parameter prediction methods are obtained, the method further comprises:
obtaining a first quantization parameter prediction value based on a first obtained quantization parameter prediction method,
obtaining a second quantization parameter prediction value based on a second obtained quantization parameter prediction method, and obtaining a refined quantization parameter prediction value based on a combination of the first quantization parameter prediction value and the second quantization parameter prediction value, wherein the predicted value of the quantization parameter for the block is determined based on the refined quantization parameter prediction value; and decoding the video data to produce decoded video data based on the predicted value of the quantization parameter.

15. The non-transitory computer readable medium of claim 14, wherein the plurality of quantization parameter prediction methods comprises at least one of:
an average luma dependent quantization parameter adaptation method, a luma activity dependent quantization parameter adaptation method, or a position dependent quantization parameter adaptation method.

16. The non-transitory computer readable medium of claim 9, wherein the plurality of quantization parameter prediction methods comprises at least one of:
an average luma dependent quantization parameter adaptation method, a luma activity dependent quantization parameter adaptation method, or a position dependent quantization parameter adaptation method.

* * * * *